Nov. 5, 1940.   R. W. KRITZER   2,220,414
COMBINED HEATING AND COOKING STOVE
Filed Aug. 26, 1938   6 Sheets-Sheet 1
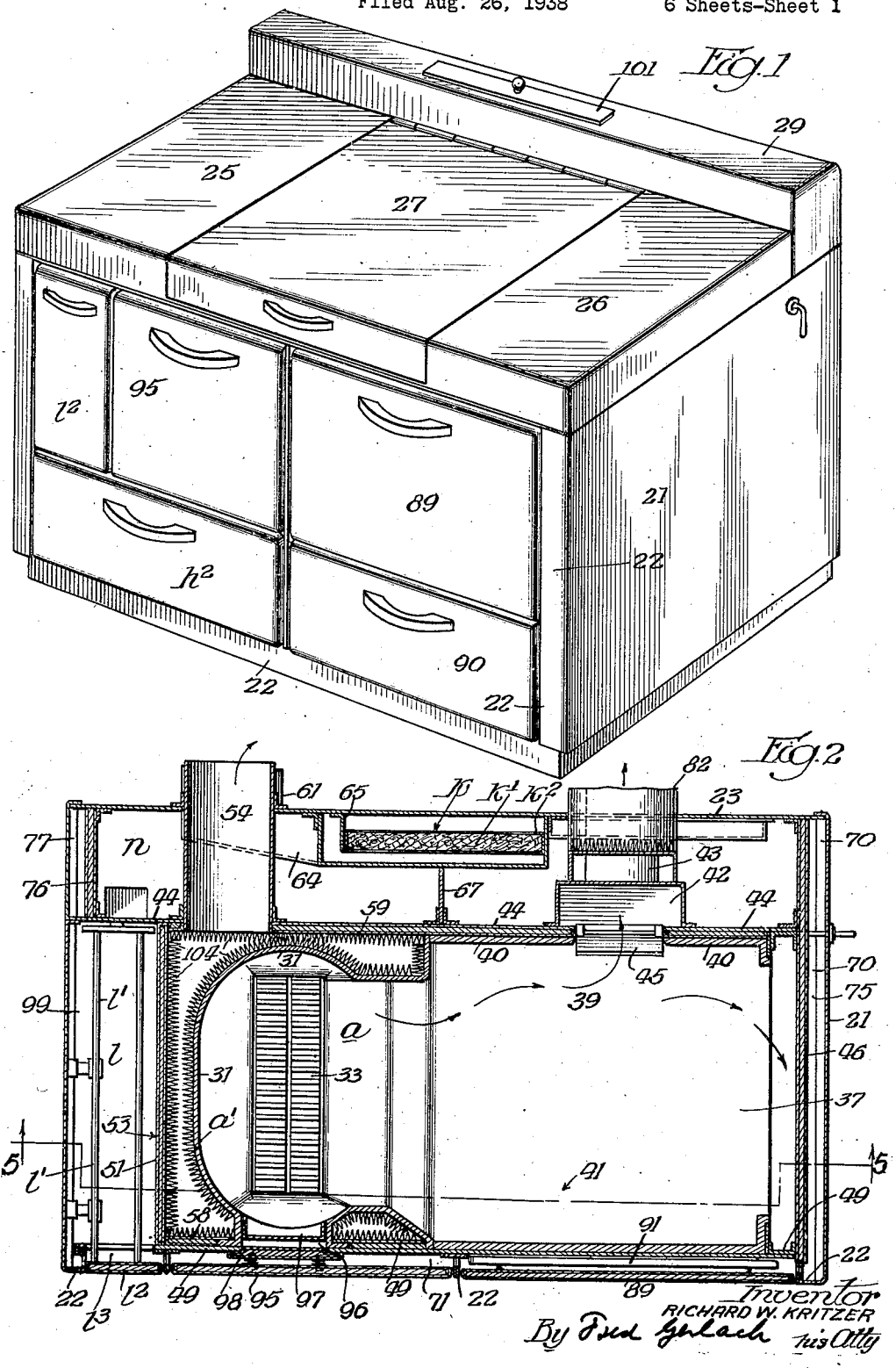

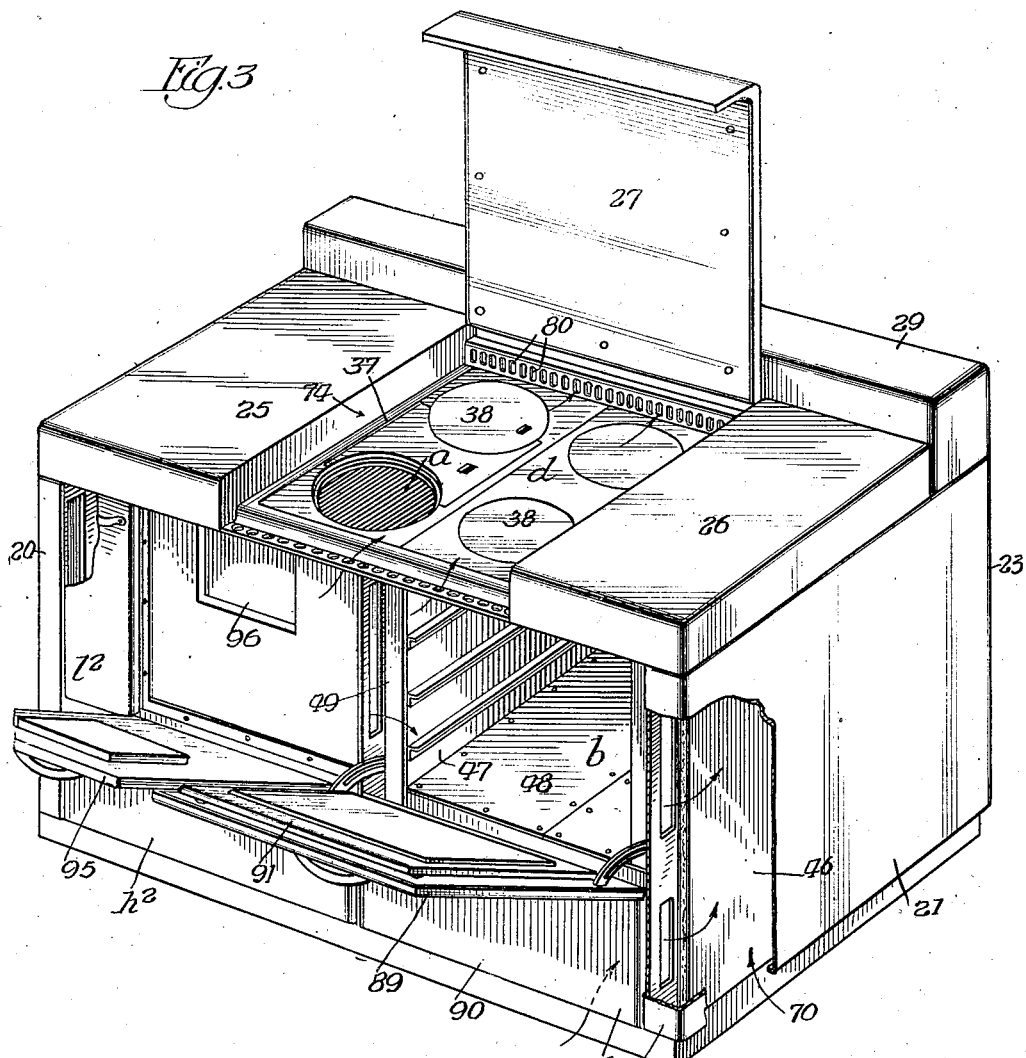
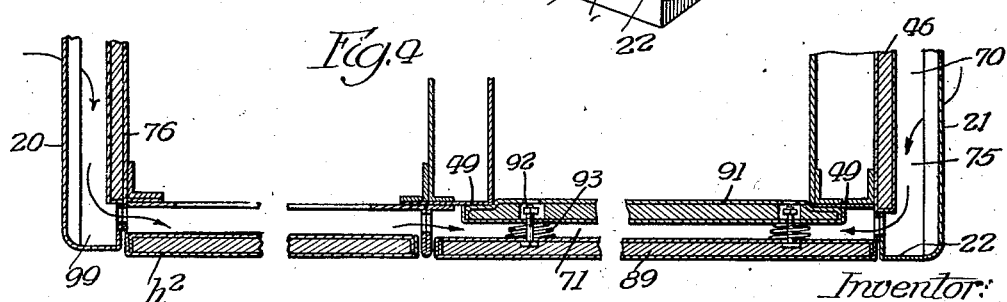

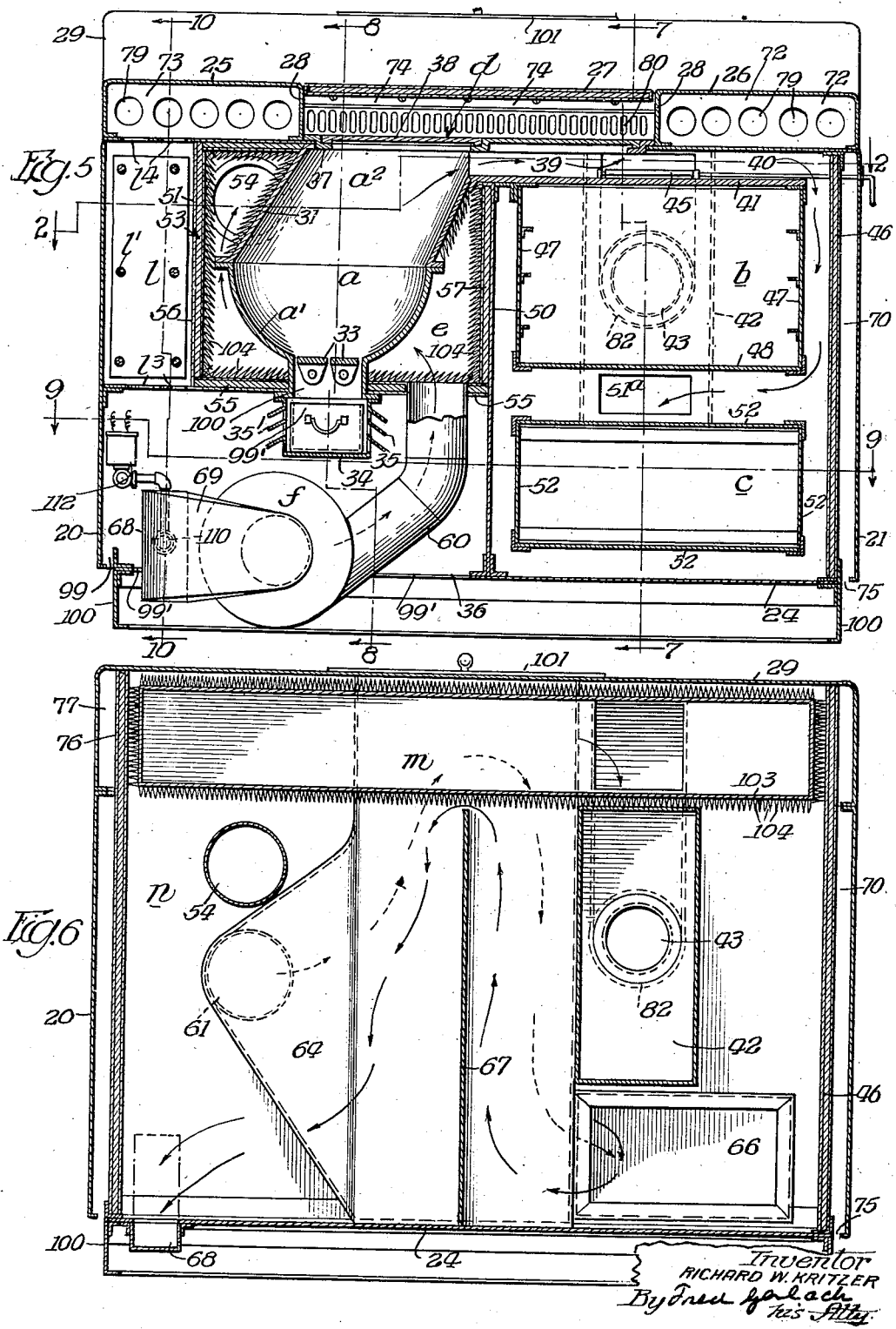

Nov. 5, 1940.   R. W. KRITZER   2,220,414
COMBINED HEATING AND COOKING STOVE
Filed Aug. 26, 1938   6 Sheets-Sheet 4
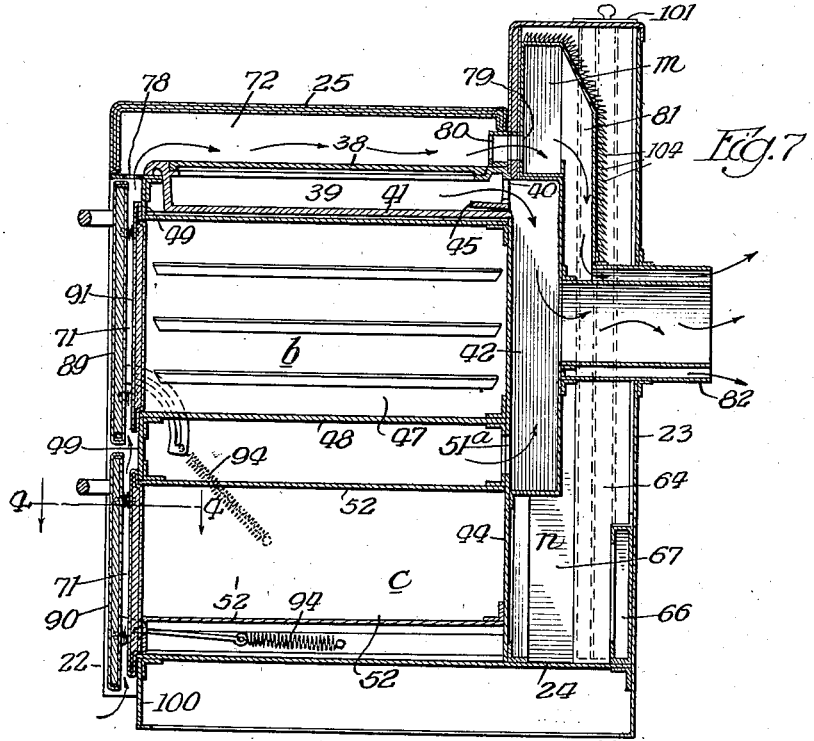
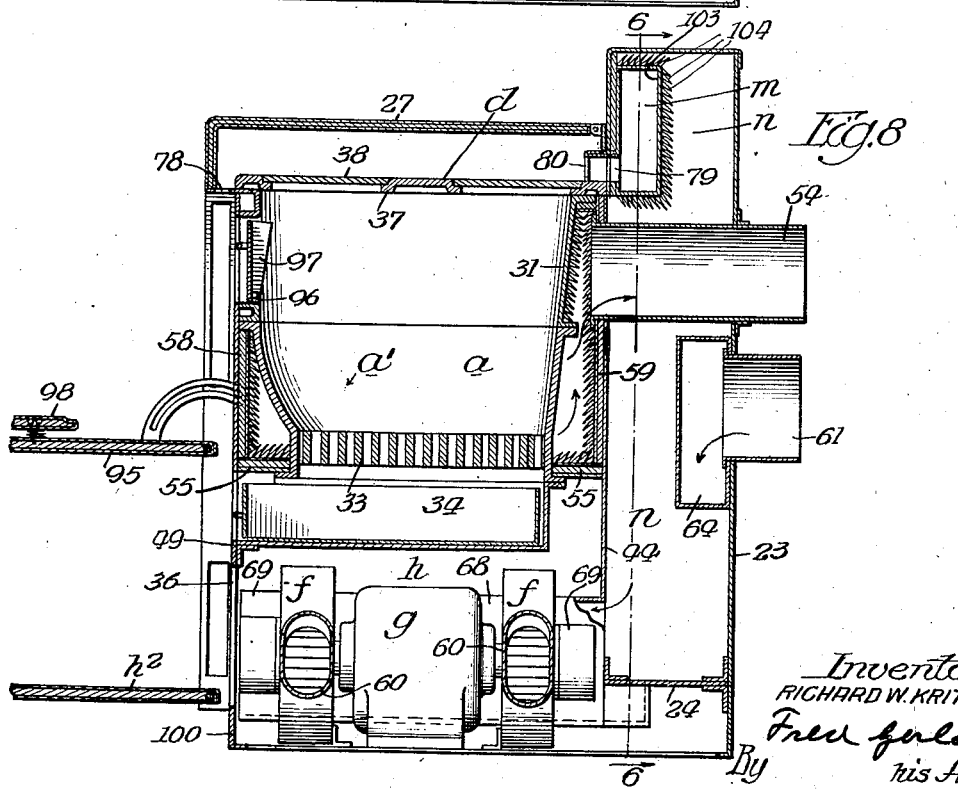
Inventor:
RICHARD W. KRITZER
By Fred Gerlach
his Atty Nov. 5, 1940. R. W. KRITZER 2,220,414
COMBINED HEATING AND COOKING STOVE
Filed Aug. 26, 1938 6 Sheets-Sheet 5
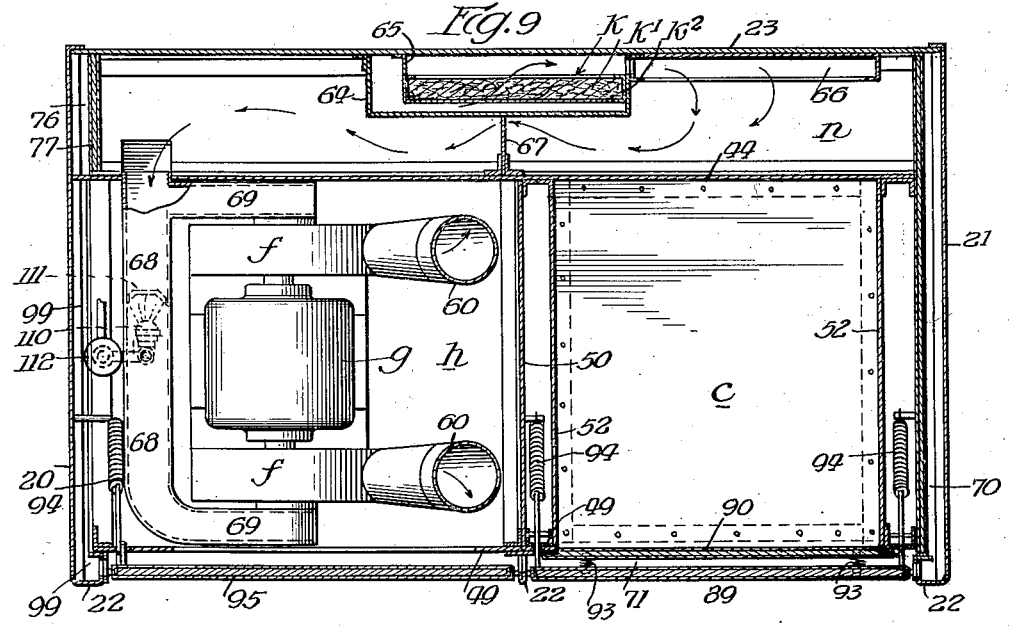
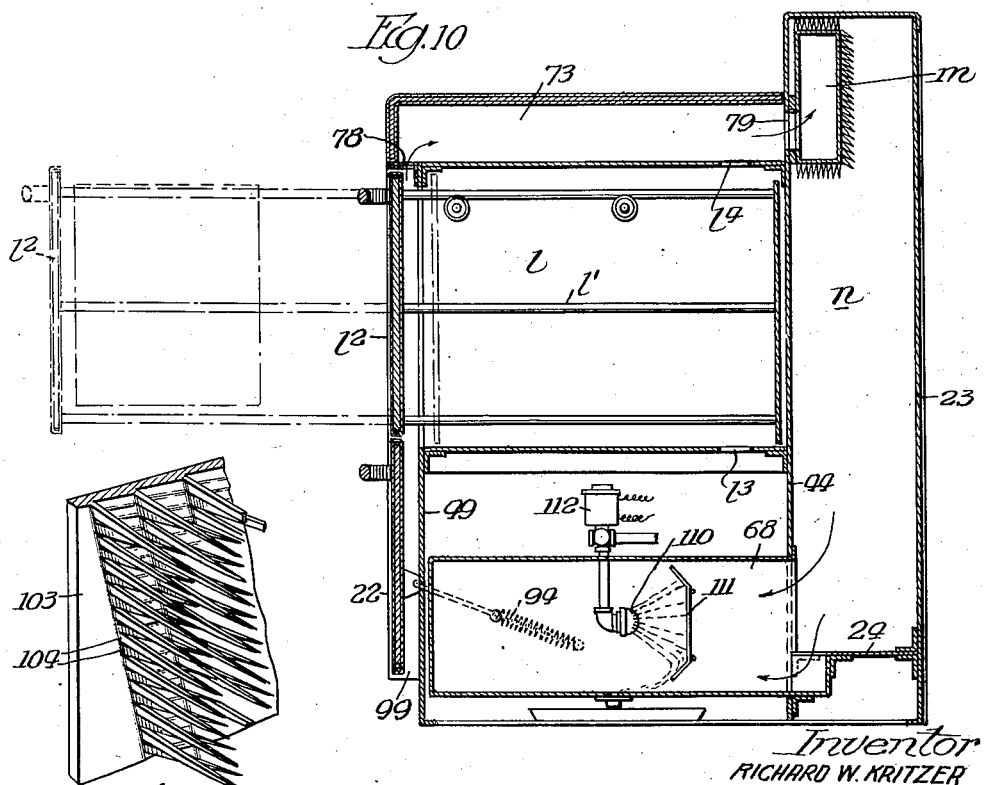
Inventor
RICHARD W. KRITZER
By Fred Gerlach
his Atty

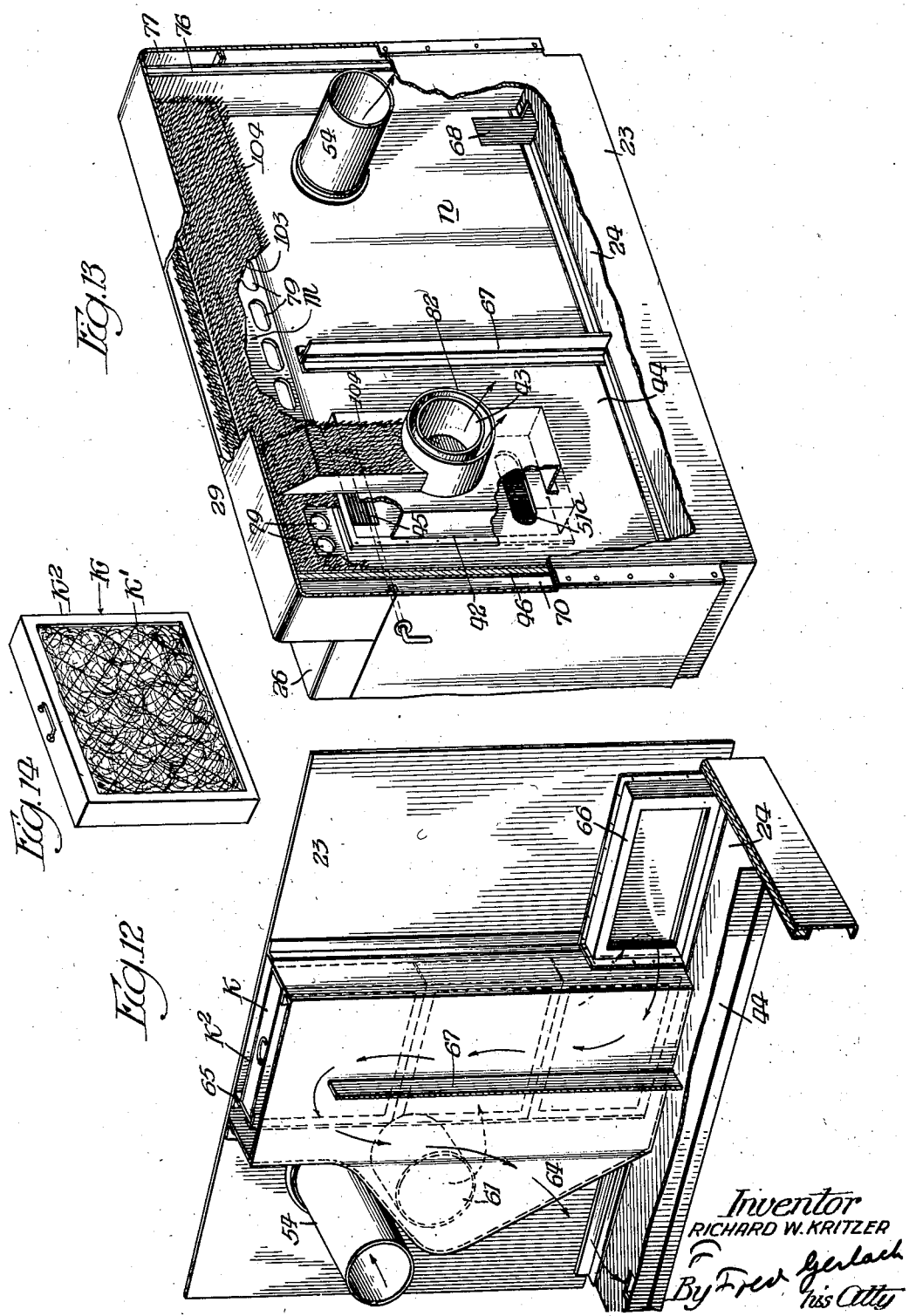

Patented Nov. 5, 1940

2,220,414

UNITED STATES PATENT OFFICE 2,220,414

COMBINED HEATING AND COOKING STOVE

Richard W. Kritzer, Chicago, Ill., assignor to Thermek Corporation, Chicago, Ill., a corporation of Delaware Application August 26, 1938, Serial No. 226,879

20 Claims. (Cl. 126—4)

The invention relates to a combined heating and cooking stove.

One object of the invention is to provide an improved combined cooking and heating stove, which is adapted to sufficiently heat the air in a heating-chamber around the fire-chamber for heating spaces or rooms remotely located from the stove, such as the rooms in a dwelling.

Heretofore, in stoves which provided for heating or for space heating, the high temperature necessary for remote space heating resulted in such high temperature around the stove as to render the area around the stove too hot or uncomfortable for cooking. The radiated heat from the stove rendered it extremely dangerous and uncomfortable in performing cooking operations if sufficient heat was generated for properly heating a number of rooms in a dwelling.

One object of the invention is to provide a stove which is adapted to generate sufficient heat for cooking and for heating a number of rooms in a dwelling and in which radiation of heat from the stove is prevented to leave the area around the stove comfortable and safe for cooking operations. This object is attained primarily by providing heat exchange elements on the outside of the walls of the fire-box or chamber and the inner faces of the walls of the surrounding air-heating chamber so that the heat will be dispersed at a sufficiently rapid rate and carried off for outside heating in connection with an air-jacket around the stove which prevents radiation of heat to the outside of the stove-body.

Another object of the invention is to provide a jacket for air around all sides of the stove-body to efficiently prevent heat transfer from the high temperature developed in the fire-chamber and the surrounding air heating chamber to the area surrounding the stove.

Another object of the invention is to provide a stove with door structures for the fire-chamber and oven in which high temperatures are developed, which comprise inner sections for the inner walls and outer sections for the outer walls, the door sections being connected together and spaced apart to provide an air passage between the door sections.

Another object of the invention is to provide an economizer which is efficient for high dispersion of heat to the air supplied to the heating chamber for outside heating.

Another object of the invention is to provide the stove with an economizer to which all the air from all portions of the air-jacket is delivered, for preheating the air delivered to the air-heating chamber.

Another object of the invention is to provide an air jacket over the cooking-top.

Another object of the invention is to provide the stove-body with an air-filter of the surface type to purify the air used for space heating and also to prevent accumulation of dirt and impurities on the heat-exchange spines used in the chambers having spined walls.

Another object of the invention is to provide the stove with means for forcing air through the air-heating chamber and a motor for driving the fan, which are located within the confines of the rectangular stove-body and so that primary air drawn to the fire-chamber will cool the motor.

Another object of the invention is to provide the stove with a drying compartment within the confines of the rectangular body of the stove and adjacent the air-heating chamber.

Other objects of the invention will appear from the detailed description.

The invention consists in the several novel features which are hereinafter set forth and are more particularly defined by claims at the conclusion hereof.

In the drawings: Fig. 1 is a perspective of a stove embodying the invention. Fig. 2 is a section taken on line 2—2 of Fig. 5. Fig. 3 is a perspective of the stove, the cover for the cooking top and the side doors being open. Fig. 4 is a section on line 4—4 of Fig. 7. Fig. 5 is a longitudinal section on line 5—5 of Fig. 2. Fig. 6 is a section taken on line 6—6 of Fig. 8. Fig. 7 is a section on line 7—7 of Fig. 5. Fig. 8 is a section on line 8—8 of Fig. 5. Fig. 9 is a section on line 9—9 of Fig. 5. Fig. 10 is a section taken on line 10—10 of Fig. 5. Fig. 11 is a detail perspective illustrating the construction of the walls which are provided with spines for heat transfer. Fig. 12 is a sectional perspective of a portion of the air-supply chamber in the back of the stove and contains the air-filter. Fig. 14 is a perspective of one of the sections of the air-filter. Fig. 13 is a perspective of the back of the stove, parts being broken away.

The invention is exemplified in a stove which has a substantially rectangular body and comprises a fire-chamber $a$; a baking oven $b$; a warming-compartment $c$; a cooking-top $d$; an air-heating chamber $e$ surrounding the fire-chamber; a pair of blowers $f$ driven by an electric motor $g$, and located in a compartment $h$ below the air-heating chamber $e$; a filter $k$ for the air used for outside heating; a drying-chamber $l$ at one side of the air-heating chamber $e$; an economizer $m$ in a chamber $n$ extending across the back and top of the body; and ducts forming an air-jacket for causing air to flow upwardly over the top and across the front of the body for preventing the dispersion of heat from the fire-chamber to the area and avoiding high temperature around the stove.

The rectangular body comprises side-walls 20 and 21, a front 22 which is provided with openings for access to the fire-chamber, baking oven, warming-oven, dryer, and the compartment $h$ which contains the blowers $f$ and motor $g$; a back wall 23; a bottom wall 24; and a top comprising fixed walls 25, 26 and a hinged cover 27 for the space above the cooking-top $b$ and between inner vertical walls 28 on the walls 25 and 26, respectively. The body also comprises walls forming a rectangular extension 29 projecting above the rectangular body and extending entirely across the entire back thereof.

An inner structure is provided in the stove-body to form an air-jacket between the walls of the body and fire-chamber $a$, air-heating chamber $e$ and cooking-oven $b$. This comprises an inner front wall 49, an inner side wall 46, a wall 40 between the cooking-top $d$ and the sides of the body, and a rear wall 44, between which and the wall 49, the ovens, the fire-chamber and the air-heating chamber are disposed.

The fire or combustion chamber $a$ for burning coal is formed in a pot comprising a lower cast-metal section $a'$ and an upper section $a^2$ formed of plates 31, each provided on its outer face with a multiplicity of integral heat-transfer spines. The plates 31 are welded together and shaped to form the upper section of the pot of the desired contour. The spines on the plates 31 are provided to quickly disperse the heat from the walls of the fire-chamber to the air-heating chamber $e$. A suitable grate 33 is provided at the bottom of the fire-chamber, an ash-pit 34 is provided below the grate and is provided with downwardly and outwardly inclined louvres 35 for the admission of air through the grate to the fire-pot for combustion. The ash-pit is disposed in the upper portion of the chamber $h$. Air enters said chamber through openings 36 in the bottom-wall 24 of the stove-body and passes through the louvres 35 to the ash-pit. The cooking-top $d$ comprises a plate 37 which partially overlies the fire-chamber $a$ and is provided with lids 38 for cooking purposes. The products of combustion pass from one side and at the top of the fire-chamber $a$ through a flue 39 formed between the top of the cooking-oven $b$ and cooking-top $d$ and the wall 40 which extends between top $d$ to the side-wall 21 of the stove-body. A cast liner 41 extends over the top of the cooking-oven $b$ and along the front and rear sides of flue 39. A vertical outlet flue 42 communicates with the rear side of flue 39 (Fig. 7) and a smoke-pipe 43 is connected to the back wall of flue 42 to carry off the products of combustion from flue 42 to the chimney. Flue 42 extends downwardly along the rear wall of the baking-oven $b$ and wall 44. A damper 45 controls the direct flow of the products of combustion from flue 39 to flue 42. The oven $b$ comprises side-walls 47 and a bottom-wall 48 which extend between inner back-wall 44 and the front-wall 49 of the inner structure. Side-walls 47 are spaced from the inner cross-wall 50 of chamber $a$ and from the inner side-wall 46 of the stove-body to form a passage around the oven for the products of combustion. Flue 39 is extended to wall 46 and communicates with the space around oven $b$. Flue 42 (Fig. 7) communicates with the space around oven $b$ through an opening $51^a$, so that the products of combustion passing around said oven can pass through flue 42 to the smoke-pipe 43. When damper 45 is closed the products of combustion will be directed to flow around, and intensely heat, oven $b$.

The warming oven $c$ comprises side, top and bottom-walls 52 which extend between front-wall 49 and back-wall 44 of the inner structure. Said walls 52 are spaced from walls 50, 46, bottom-wall 24 and the bottom of oven $b$ so that some of the products of combustion passing around the oven $b$ will pass around the warming oven and to the outlet $51^a$.

The air-heating chamber $e$ which surrounds the fire-chamber is built up of plates 53 welded together and provided with a multiplicity of integral inwardly projecting spines for heat transfer to the air forced through the chamber $e$ to the outlet 54 for the heated air. This outlet is connected to deliver the heated air to any point desired for outside use, such as adjoining rooms. The walls of chamber $e$ are formed by a bottom-plate 55, side-plates 56, 57, a front plate 58 disposed inwardly of wall 49, and a back-plate 59, the inner faces of which are all provided with such spines to transfer the heat to the air flowing through chamber $e$ at a sufficient rate and to avoid heat losses from chamber $e$. Walls 50, 51; 49 and 44, where they extend around chamber $e$, are insulated to prevent radiation from the plates forming the walls of said chamber.

A heat-exchange wall of the requisite thermal efficiency for the walls of the fire-pot, the heating-chamber and the economizer, is illustrated in Fig. 11. This element consists of a plate or wall 103 from one face of which a multiplicity of spines 104 are gouged and bent to project therefrom. The spines preferably extend in oblique parallel rows across the face of the plate and are pointed at their ends. The exposed area of these spines has a high ratio to the mass therein and being integral with the plate or wall, are bonded for efficient thermal conduction. The alternating spines are bent in opposite directions to leave spaces for the air-flow across the wall.

Blowers $f$ and motor $g$ are located in the chamber $h$ which is disposed below the ash-pit 34 and chamber $e$ and between side-wall 20 of the body and the lower portion of cross-wall 50. The discharge trunks 60 of blowers $f$ are connected to openings in the bottom-plate 55 of air-heating chamber $e$ so that the blowers will force air through chamber $e$ and around the walls of the fire-chamber at a sufficiently high rate to heat the air sufficiently for room-heating and to prevent dispersion of the heat from the fire-pot to the space around the stove. The air, in passing through chamber $e$, contacts with the spines on the outer face of the walls of the fire-pot and the inner faces of the air-heating chamber $e$, which produces adequate heat thermal transfer efficiency for this purpose. From chamber $e$ the heated air passes through outlet pipe 54, which extends across chamber $n$, to the place or places of use. An insulated door $h^2$ is provided in the front of the body for access to the ash-pit.

The air to be heated enters the back portion of the stove through a pipe 61 and flows into a casing 64 located inside of chamber n which contains the filter k. Casing 64 is disposed adjacent the back-wall 23 of the stove-body and centrally of chamber n.

Filter k is of the extended surface type and comprises sections, each of which comprises a mass of spun glass k' or other filtering medium and wire netting $k^2$ for retaining the glass. This filter is disposed in and extends vertically of casing 64, and its faces are spaced from the walls which form the front and back of casing 64. One end of the filter abuts against one end of casing 64 and the other against a partition 65 so that the filter k forms a barrier between the spaces at the front and back of the filter so the air must pass through the filter in order to pass out of casing 64. The outlet space in casing 64 at one side of the filter communicates with a flue 66 formed along the back-wall 23. Flue 66 discharges near the bottom and near one end of chamber n. A vertical baffle 67 in chamber n deflects the air which enters through flue 66 into the lower portion of chamber n to the top of said chamber so the air will travel in a circuitous path in transit through said chamber. A pipe 68 is connected to the front and at the left hand side of baffle 67 and provided with branches 69 for conducting air from chamber n to the blowers f.

In operation, the air to be heated, which may be taken from any source, is drawn through inlet pipe 61 by blowers f into the casing 64, thence through the filter k to flue 66 and into the lower portion of right hand side of the chamber n. It then is drawn over the upper end of baffle 67 into the left hand side of chamber n and through pipes 68, 69 into the suction side of the blowers f. The blowers force the filtered air through the air-heating chamber e and around the fire-pot and thence through the outlet pipe 54 to the space or rooms to be heated. The heat-exchange or radiating spines on the walls of the fire-pot and chamber e and within said chamber, effect a high degree of heat transfer to the air forced through said chamber so that it will efficiently heat a room or rooms.

The inner side-wall 46, walls 50 and 51 of chamber e, and the inner front-wall 49 are insulated to confine the heat to the heating-chamber e, flue 39 and the ducts around the oven b, c. The space 70 between the inner insulated side-wall 46 and outer side-wall 21 of the stove-body, the space 71 across the front of the stove and between the inner front-wall 49 and the outer front-wall 22 of the stove-body, the spaces 72 and 73 between the outer top-walls 25 and 26 and the inner top-wall 40 and the space 74 between the hinged cover 27 and the cooking-top 38, form an air-jacket to provide a curtain of air within the stove-body on the outside of air-heating chamber e, fire-body a and ovens b and c to confine the heat within the stove-body and prevent it from raising the temperature around the stove to a degree which will render it uncomfortable or unsafe for cooking. The air for this purpose enters spaces 70 through openings 75 in the bottom-wall 24, and the space 71 between the inner front-wall 49 and the outer front-wall 42 through openings in the bottom of the body. The insulated inner side-wall 46 extends to the back of inner back-wall 44 and to the outer back-wall 23 so that air-space 70 is provided at the right end of chamber n. An insulated wall 76 extends between inner back-wall 44 and outer back-wall 23 at the other end of chamber n to form an air-space 77 around that end of said chamber. Air from the space 71 between the inner front-wall 49 and outer front-wall 22 communicates through openings 78 with the air-chambers 72, 73, which are located on the top of the body between the body-sides and cooking-top d and with the space 74 between the cooking-top d and the hinged cover 27.

When the cooking-top is being used, cover 27 will be raised. The draft in the economizer m will draw air through openings 80 from the top of the stove to remove the heat and odors from top-cooking. When cover 27 is closed, air will be drawn from the space 71 between the inner front-wall 29 and outer front-wall 22 and through the space 74 between cooking-top d and the cover to the economizer.

All of the air from the air-jacket is delivered into the economizer m, which is rectangular in shape, and disposed in the upper front-portion of the chamber n in the body. For efficiency, it extends entirely across the chamber n. The front wall of the economizer is insulated from the back-wall 44 of the inner structure. Openings 79 in back-wall 40 conduct the air from chambers 72, 73 into the economizer. Openings 80 in the inner back-wall 44 conduct air from space 74 below cover 27 into the economizer. A flue 81 is connected to the back-side of the economizer m and the latter is connected to deliver air into a pipe 82 (Fig. 13) which surrounds the smoke-pipe 43 and is connected in practice to the chimney where it is subjected to draft. The bottom, end and top-walls of the economizer are made of plates which are provided with outwardly projecting spines for transferring the heat in the walls of the economizer to the chamber n through which the cold air is drawn by the blowers f so that the air supplied to the air-heating chamber e by the blowers will be preheated and the temperatures of the outflowing air from the jacket around the inner structure will be reduced before it passes into the stack to which the stove is connected.

In operation, the draft in the stack will produce a suction in pipe 82 to draw air through flue 81 from the economizer m. This will cause the air surrounding the bottom of the stove-body to be drawn vertically through the spaces 70 and 71 and horizontally through spaces 72, 73 and space 74 when cover 27 is closed into the economizer. This jacket of air between the inner structure of the stove and the outer walls of the body will prevent radiation of heat from the inner structure to the space around the stove-body and will also serve to remove impure air or cooking odors from the area around the bottom of the stove and deliver them into the stack.

Openings are provided in the inner front wall 49 and outer wall 22 for access to the ovens b and c. An opening is provided in inner front wall 49 for access to the fire-pot. A hinged door 89 is provided for closing the baking compartment b. A hinged door 90 is adapted to close the opening which provides access to the compartment c.

In order to make it possible to provide a vertically flowing substantially unobstructed stream of air between the front of the inner structure and the outer front of the body where the doors are located for access to the ovens b and c and to seal the openings therefor in the inner structures, each of the doors 89 and 90 comprises an outer section fitting in the opening in front-wall 22 and an inner door-section 91 which is adapted to seal the opening in the inner front-wall 49. Each inner door-section is connected to the outer door-section by means of bolts 92 and springs 93 surrounding the bolts which are adapted to press the inner door-section into firm contact with wall 49 to seal the front of the oven-chamber e, when the outer door-section is closed. Springs 93 force the inner door-sections to their seats to prevent the escape of heat from the ovens into the air-space 70 between the door-sections. Springs 94 are usually applied to doors 89, 90 to hold them normally closed. The door-sections are preferably insulated to prevent the radiation of heat from the ovens into space 70 and from space 70 to the area around the stove.

A door 95 is provided to close the opening in the outer front-wall 22 which provides access to the fire-pot. The feed-opening 96 in the front of the fire-pot is provided with a door 97 which may be manually closed. Door 95 is provided with an inner section 98 which is connected to door 95 by bolts and springs similar to those used for the inner section of the oven-doors so that when door 95 is closed, section 98 will be pressed against the opening 96 in inner front-wall 49 to prevent the escape of heat from said opening when door 95 is closed.

In operation of the stove, air for combustion enters the chamber h through openings 99 in the bottom-wall 24 and openings 99' in a rectangular base frame 100 on which the stove-body is supported and secured. The margins of frame 100 are inset from the outer walls of the body so that openings can be provided in the bottom of the body for the entry of air to the ducts around the inner structure. The air passing to the louvres 35 passes around and serves to cool the electric motor g.

The drying-chamber l is provided at one side of the stove between insulated wall 51, outer side-wall 20, inside back-wall 44 and front-wall 22. A rack l' on which clothes to be dried may be hung, is mounted to slide into and out of the chamber l through an opening in the front-wall 22 which is normally closed by the insulated front l² of the rack. Air for drying the material in chamber l enters its bottom through openings l³ and passes out of its top through holes l⁴ into chamber 73 which is subjected to the draft from the chimney to cause air to circulate through chamber l and carry off the moisture in the material to be dried.

An opening is provided in the top 29 of chamber n for access thereto and is closed by a removable cover 101.

In order to humidify the air used for outside heating, a spray-nozzle 110 is disposed to direct a spray of water against a baffle 111, which is disposed in the air-pipe 68. An electromagnetically-controlled valve 112 controls the delivery of water to the nozzle 110. The electromagnet of this valve is connected to a humidostat located in the room being heated to automatically control the supply of a predetermined amount of moisture to the air used for outside heat.

The invention is not to be understood as restricted to the details set forth, since these may be modified within the scope of the appended claims, without departing from the spirit and scope of the invention.

Having thus described the invention, what I claim as new and desire to secure by Letters Patent is:

1. A combined cooking and heating stove comprising walls forming a substantially rectangular body and enclosure, a fire-chamber, an air-heating chamber surrounding the fire-chamber, means for forcing air through the air-heating chamber for outside heating, an inner wall-structure spaced from the walls of the body and extending around the fire-chamber and heating chamber, the body and inner structure being spaced apart to form an air-jacket at the front and sides, and means for circulating air through the air-jacket for preventing dispersion of heat from the air-heating and fire-chamber and for preventing heat radiation to the area around the outside of the stove-body.

2. A combined cooking and heating stove comprising walls forming a substantially rectangular body and enclosure, a fire-chamber, an air-heating chamber surrounding the fire-chamber, a cooking-top, means for forcing air through the air-heating chamber for outside heating, an inner wall-structure spaced from the walls of the body and extending around the fire-chamber and heating chamber, the body and inner structure being spaced apart to form an air-jacket at the front and sides and over the top, means for circulating air through the air-jacket and over the cooking top for preventing dispersion of heat from the air-heating and fire-chamber and for preventing heat radiation to the area around the outside of the stove-body, and means for transferring heat from the air-jacket to the air supplied to the air-heating chamber.

3. A combined cooking and heating stove comprising walls forming a substantially rectangular body and enclosure, a fire-chamber, an air-heating chamber surrounding the fire-chamber, an oven in the body and disposed to be heated by heat from the fire chamber and laterally of the air-heating chamber, means for forcing air through the air-heating chamber for outside heating, an inner wall-structure spaced from the walls of the body and extending around the fire-chamber, heating-chamber and oven, the body and inner structure being spaced apart to form an air-jacket at the front of the fire chamber and air-heating chamber and in front of the oven and means for circulating air through the air-jacket for preventing dispersion of heat from the air-heating chamber and fire-chamber and the front of the oven and for preventing heat radiation to the area around the outside of the stove-body.

4. A combined cooking and heating stove comprising walls forming a substantially rectangular body and enclosure, a fire-chamber, an air-heating chamber surrounding the fire-chamber, means for forcing air through the air-heating chamber to heat air for outside heating, an inner wall-structure spaced from the walls of the body and extending around the fire-chamber, heating-chamber, the body and inner structure being spaced apart to form an air-jacket at the front and sides, and including insulated walls around the air-heating chamber, and means for circulating air through the air-jacket for preventing dispersion of heat from the air-heating and fire-chamber and for preventing heat-radiation to the area around the outside of the stove-body.

5. A combined cooking and heating stove comprising walls forming a substantially rectangular body, a fire-chamber, an air-heating chamber surrounding the fire-chamber, a cooking-top, a blower for forcing air through the air-heating chamber for outside heating, a motor for driving the blower, the fire-chamber, the air-heating chamber, the blower and driving-means being disposed within the rectangular body.

6. A combined cooking and heating stove comprising walls forming a substantially rectangular body, a fire-chamber, an air-heating chamber surrounding the fire-chamber, a cooking-top, a blower for forcing air through the air-heating chamber to heat air for outside heating, a motor for driving the blower, an inner wall-structure around the fire-chamber, the air-heating chamber and spaced from the walls of the body to form an air-jacket at the sides and front of the body, the blowers and driving-means being disposed within the rectangular body.

7. A combined cooking and heating stove comprising walls forming a substantially rectangular body, a fire-chamber, an air-heating chamber surrounding the fire-chamber, a cooking-top, a drying chamber, a blower for forcing air through the air-heating chamber to heat air for outside heating, a motor for driving the blower; the air-heating chamber, the drying-chamber, blowers and driving-means being disposed within the rectangular body.

8. A combined heating and cooking stove comprising walls forming a substantially rectangular body, a cooking-top over a portion of the top of the body and an air circuit in the remaining portion of the top and at the sides of and above the cooking top, a cover for closing the space over the cooking-top and between the walls of said conduits, a fire-chamber in the body, an air-heating chamber surrounding the fire-chamber, means for forcing air through the air-heating chamber to heat air for outside heating, an inner structure around the fire-chamber and air-heating chamber forming an air-jacket at the front and sides of the body, and means for circulating air through the air-jacket, the conduits, and over the cooking-top.

9. A combined heating and cooking stove comprising walls forming a substantially rectangular body, a cooking-top over a portion of the top of the body and an air circuit in the remaining portion of the top and at the sides of and above the cooking-top, a cover for closing the space over the cooking-top and between the walls of said conduits, a fire-chamber in the body, an air-heating chamber surrounding the fire-chamber, means for forcing air through the air-heating chamber to heat air for outside heating, an inner structure around the fire-chamber and air-heating chamber forming an air-jacket at the front and sides of the body, means for circulating air through the air-jacket, the conduits and over the cooking-top, and means for transferring heat from the air from the conduits to the air supplied to the air forced to the air-heating chamber.

10. A stove comprising a substantially rectangular body, a fire-chamber in the body, an air-heating chamber surrounding the fire-chamber, the walls of the heating-chamber being provided with a mass of inwardly extending spines for high thermal transfer, and means for forcing air through said air-heating chamber for outside heating.

11. A stove comprising a substantially rectangular body, a fire-chamber in the body, an air-heating chamber surrounding the fire-chamber, substantially all of the inner faces of the walls of the heating-chamber being provided with a mass of inwardly extending spines, an inner wall-structure in the body forming an air-jacket around the heating-chamber, and means for forcing air through said air-heating chamber to heat air for outside heating.

12. A stove comprising a substantially rectangular body, a fire-chamber in the body, an air-heating chamber surrounding the fire-chamber, the outer faces of the walls of the fire-chamber being provided with an outwardly extending mass of spines and inner faces of the walls of the heating-chamber being provided with an inwardly extending mass of spines for high thermal transfer, and means for forcing air from said air-heating chamber for outside heating.

13. A stove comprising a substantially rectangular body, a fire-chamber in the body, an air-heating chamber surrounding the fire-chamber and within the body, means for forcing air through the heating-chambers for outside heating, an air-supply chamber, an inner structure forming an air-jacket around the sides and front of the body, an economizer provided with a multiplicity of heat-radiating elements in the supply-chamber, and means for delivering air from the air-jacket to the economizer for transfer of heat to the air in the supply chamber.

14. A stove comprising a substantially rectangular body, a fire-chamber in the body, an air-heating chamber surrounding the fire-chamber and within the body, means for forcing air through the air-heating chamber for outside heating, an air-supply chamber extending across the back of the body and provided with an air inlet, an inner structure forming an air-jacket around the sides and front of the body, an economizer in said supply-chamber and extending across the back of the body, and means for delivering air from the air-jacket to the economizer for transfer of heat to the air in the supply-chamber.

15. A stove comprising a substantially rectangular body, a fire-chamber in the body, an air-heating chamber surrounding the fire-chamber and within the body, means for forcing air through the air-heating chamber for outside heating, an air-supply chamber extending across the back of the body and provided with an air inlet, an inner structure forming an air-jacket around the sides and front of the body, an economizer in said supply-chamber and extending across the back of the body, the walls of the economizer being provided with a multiplicity of splines for high thermal transfer, and means for delivering air from the air-jacket to the economizer for transfer of heat to the air in the supply-chamber.

16. A combined heating and cooking stove comprising a substantially rectangular body, a fire-chamber in the body, an air-heating chamber surrounding the fire-chamber, an air-supply chamber extending across the back of the body and provided with an air-inlet, an inner structure forming an air-jacket around the sides and front of the body, an economizer in the upper portion of the supply-chamber and extending across the back of the body, and means for delivering air from the air-jacket to the economizer for transfer of heat to the air in the supply-chamber.

17. A combined heating and cooking stove comprising a substantially rectangular body, a fire-chamber in the body, an air-heating chamber surrounding the fire-chamber, an air-supply chamber at the back of the body, an air filter in said supply-chamber, an inner structure forming an air-jacket around the sides and front of the body, an economizer provided with heat-radiating elements in the upper portion of the supply-chamber and extending across the back of the body, means for delivering air from the air-jacket to the economizer for transfer of heat to the air in the inlet-chamber, and means for forcing air from the filter through the air-heating chamber for outside heating.

18. A combined heating and cooking stove comprising a substantially rectangular body, a fire-chamber within the body, a cooking-top over the fire-chamber, an air-heating chamber surrounding the fire-chamber, an air-inlet chamber extending substantially across the back of the body, an air flue in the lower portion and at one side of the chamber, a baffle centrally disposed in said chamber for deflecting the air from the flue around the inlet chamber, an air-outlet connected to the lower portion of the other side and at the other side of the baffle, and means for forcing air from said outlet flue to and through the air-heating chamber for outside heating.

19. In a combined heating and cooking stove, the combination of a substantially rectangular body, a fire-chamber in the body, an oven in the body, an inner structure forming an air-jacket at the sides and front of the body, the front of the body and the inner structure having openings for access to the oven, a door comprising sections spaced apart for closing both openings, respectively, and connected together for conjoint movement, and pressure-means between the sections for forcing the inner section against its seat on the inner structure, the air-jacket including the space between the sections.

20. In a combined heating and cooking stove, the combination of a substantially rectangular body, a fire-chamber in the body, an inner structure forming an air-jacket at the front of the body, the front wall of the body and the front of the inner structure having openings therein for access to the fire-chamber, and a door comprising spaced sections for closing the openings in the inner structure and the front wall and connected together for conjoint movement, and pressure-means between the sections for forcing the inner section against its seat, the air-jacket including an air-space between the sections.

RICHARD W. KRITZER.